(12) United States Patent
Feyt

(10) Patent No.: US 7,376,844 B2
(45) Date of Patent: May 20, 2008

(54) COUNTERMEASURE METHOD FOR A MICROCONTROLLER BASED ON A PIPELINE ARCHITECTURE

(75) Inventor: Nathalie Feyt, Cuges les Pins (FR)

(73) Assignee: Gemplus, Gemenos (FR)

( * ) Notice: Subject to any disclaimer, the term of this patent is extended or adjusted under 35 U.S.C. 154(b) by 676 days.

(21) Appl. No.: 10/240,542

(22) PCT Filed: Mar. 16, 2001

(86) PCT No.: PCT/FR01/00794

§ 371 (c)(1),
(2), (4) Date: Oct. 21, 2002

(87) PCT Pub. No.: WO01/77791

PCT Pub. Date: Oct. 18, 2001

(65) Prior Publication Data

US 2003/0115478 A1 Jun. 19, 2003

(30) Foreign Application Priority Data

Apr. 6, 2000 (FR) .................................. 00 04426

(51) Int. Cl.
*G06F 11/30* (2006.01)
*G06F 12/14* (2006.01)
*H04L 9/32* (2006.01)
*G06F 9/44* (2006.01)

(52) U.S. Cl. .................... 713/194; 712/220; 712/245

(58) Field of Classification Search .................. None
See application file for complete search history.

(56) References Cited

U.S. PATENT DOCUMENTS

| 4,077,061 A | * | 2/1978 | Johnston et al. ............... 702/58 |
| 4,910,671 A | | 3/1990 | Kitamura et al. |
| 5,761,466 A | * | 6/1998 | Chau ........................... 712/200 |
| 5,944,833 A | * | 8/1999 | Ugon .......................... 713/400 |
| 6,470,291 B1 | * | 10/2002 | Goker et al. ................. 702/145 |
| 6,575,373 B1 | * | 6/2003 | Nakano ...................... 235/492 |

FOREIGN PATENT DOCUMENTS

| EP | 0 977 108 | 2/2000 |
| EP | 0 977 108 A2 | 2/2000 |
| FR | 2 745 924 | 9/1997 |

OTHER PUBLICATIONS

Cohen, Frederick, B., *Operating system protection through program evolution*, Computers & Security, vol. 12, No. 6, Oct. 1993, pp. 565-584, Oxford, GB.

* cited by examiner

*Primary Examiner*—Gilberto Barron, Jr.
*Assistant Examiner*—Virgil Herring
(74) *Attorney, Agent, or Firm*—Buchanan Ingersoll & Rooney PC

(57) ABSTRACT

A countermeasure method for a microcontroller that executes sequences of instructions. The instructions are executed according to a pipeline method. At least one waiting time is randomly introduced between two consecutive instructions and/or within at least one instruction. The method is implemented by the electronics of the microcontroller rather than by software addition.

9 Claims, 2 Drawing Sheets

```
Instruction 1 :    F  D  E  W
Instruction 2 :       B  F  D  E  W
Instruction 3 :          F  D  B  E  W
Instruction 4 :             B  F  B  D  E  W
Instruction 5 :                F  D  E  B  W Clock cycle :  1  2  3  4  5  6  7  8  9
```

Fig. 3

| | | | | | | | | |
|---|---|---|---|---|---|---|---|---|
| Instruction 1 : | F | D | E | W | | | | |
| Instruction 2 : | | | | | F | D | E | W |
| Clock cycle : | 1 | 2 | 3 | 4 | 5 | 6 | 7 | 8 |

Fig. 4

| | | | | | | | | | |
|---|---|---|---|---|---|---|---|---|---|
| Instruction 1 : | F | D | E | W | | | | | |
| Instruction 2 : | | F | D | E | W | | | | |
| Instruction 3 : | | | F | D | E | W | | | |
| Instruction 4 : | | | | F | D | E | W | | |
| Instruction 5 : | | | | | F | D | E | W | |
| Instruction 6 : | | | | | | F | D | E | W |
| Clock cycle : | 1 | 2 | 3 | 4 | 5 | 6 | 7 | 8 | 9 |

Fig. 5

| | | | | | | | | | |
|---|---|---|---|---|---|---|---|---|---|
| Instruction 1 : | F | D | E | W | | | | | |
| Instruction 2 : | B | F | D | E | W | | | | |
| Instruction 3 : | | | F | D | B | E | W | | |
| Instruction 4 : | | | | B | F | B | D | E | W |
| Instruction 5 : | | | | | F | D | E | B | W |
| Clock cycle : | 1 | 2 | 3 | 4 | 5 | 6 | 7 | 8 | 9 |

COUNTERMEASURE METHOD FOR A MICROCONTROLLER BASED ON A PIPELINE ARCHITECTURE

This disclosure is based upon French Application No. 00/04426, filed on Apr. 6, 2000 and International Application No. PCT/FR01/00794, filed Mar. 16, 2001, the contents of which are incorporated herein by reference.

BACKGROUND OF THE INVENTION

The present invention relates to a countermeasure method for a microcontroller in which sequences of program instructions are executed.

The present invention applies in particular to protected electronic components such as microcontrollers for chip cards, for example.

Microcontrollers are monolithic integrated circuits incorporating at least one microprocessor, also referred to as a CPU, standing for Central Processing Unit in English terminology These microcontrollers are true computers on a single silicon substrate, or integrated circuit chip.

Thus microcontroller chip cards constitute protected information carriers which have the same structure as a computer, that is to say they make it possible to store data and also to process information. In this context, the role of the microcontroller is to authenticate the card and its bearer, to encode and decode messages and to calculate electronic signatures proving that a licit operation has indeed been performed.

FIG. 1 illustrates schematically the structure of a microcontroller for a chip card. Such a microcontroller, integrated on a chip, has a microprocessor, or CPU, able to process the data and programs recorded on the chip. The microprocessor is associated with different types of memory by means of data buses. The operating programs and the algorithms are generally stored in a ROM memory, whilst the data, secret or not, are stored in a programmable memory of the EEPROM type, for example. A RAM memory contains the working registers necessary for the various internal processing actions. An input/output component, composed of a connector, for a chip card with contact, provides the dialogues with the outside world.

The operations of the microcontroller are sequenced by a clock (CLK). The microcontroller also has a power supply Vcc and an earth GND.

There are essentially two families of microcontroller. The majority of microcontrollers existing at the present time (approximately 90%) are based on a CISC (from the English Complex Instructions Set Computer) architecture in which the instructions are read and executed sequentially by a large decoding engine. However, the current trend is to use, more and more, microcontrollers with RISC (from the English Reduced Instruction Set Computer) architecture in which the instructions are read and executed in parallel. Such an architecture requires several expensive decoding engines in place on the integrated circuit chip, but it is also much more rapid in the execution of the sequences of instructions. In particular, RISC architectures using a so-called "pipeline" method make it possible to interleave several instructions by dividing them into substeps and executing steps of several instructions in the same clock cycle. The particularities of the pipeline in RISC architecture will be enlarged on hereinafter.

The execution of programs by the microcontroller must therefore be protected since all or some of the data being manipulated are secret. The protection can be provided by mathematical algorithms integrated into the programs executed, and/or by so-called countermeasure methods.

A countermeasure method is a protection method which consists of preventing the data manipulated during the execution of the instructions of a program being able to be interpreted outside the protected component. Such a leakage of information is possible through the very structure of the microcontroller, which may suffer what are referred to as power attacks, or DPA, standing for Differential Power Attack in English terminology.

FIG. 2 illustrates the principle of power attack by means of a graph of the current consumption I of the chip according to the number of clock beats t.

When the microprocessor executes a program composed of a sequence of instructions (Ins1, Ins2, Ins3, . . . ), with an algorithm, whether secret or not, it seeks the necessary data in memory, processes them and writes the results in memory.

Conventionally, the execution of a sequence of instructions always takes place in the same way, identical and determined, whatever the architecture (CISC or RISC) of the microcontroller used.

It then becomes possible to effect a power attack simply by reading the current consumption of the microcontroller (from its power supply Vcc), which may allow information on the secret data being handled to show through. In order to obtain such information, it is necessary to perform the same sequence of instructions several times. It then becomes possible to correlate the current consumption with the data processed during the execution of the same instruction. The current consumption of the microcontroller can thus become a veritable indicator of the data being manipulated.

For example, an attacker can proceed in the following manner. If a secret data item of eight bytes k[i], with i from 1 to 8, is considered. An accumulator is used and a loop is effected for i from 1 to 8 Acc=k[i]xor k[i+1]. At the end of the loop, Acc=xor($\Sigma$(i=1 to 8)k[i]) is obtained. When the current consumption I is observed as a function of time during this sequence (loop), a curve is obtained with the cyclic trend which is the reflection of what was executed in the microcontroller, that is to say in the example cited eight identical signals are obtained for the eight operations of the loop. Nevertheless, if each element of the signals is compared, it is possible to extract differences, and thus information on the k[i] secrets. Observation is also facilitated by the possibility of having the same loop executed several times. The current consumption of the card being the same for one and the same sequence of operations, it is possible to extract the information sought.

Consequently it becomes essential to eliminate the repetition in the current consumption for the same sequence of instructions. This is the objective of the countermeasure methods.

Such countermeasure methods already exist, in particular in the software field, where programs containing random variants may be used. Such programs can have recourse to subprograms in a random fashion. Thus, for the same task repeated several times, which conventionally would invoke the same sequence of instructions, different subprograms are invoked and give rise to the execution of different sequences of instructions. It becomes impossible to correlate the current consumption and the data being manipulated.

Such a software solution is however complex to implement. It is necessary in fact to write the different subprograms, which is expensive in development time and in code size.

SUMMARY OF THE INVENTION

The object of the present invention is a countermeasure method which resolves the drawbacks of the prior art. The invention proposes such a countermeasure method based on the execution of the sequences of instructions according to a so-called pipeline method in an electronic component with RISC architecture, for example.

The invention introduces the principle of random and non-reproducible execution at each sequence of instructions at the level of the instruction itself.

The invention more particularly relates to a countermeasure method for a microcontroller able to execute sequences of instructions, the said instructions being executed according to a so-called pipeline method, characterised in that the method consists of randomly introducing at least one waiting time between two consecutive instructions and/or within at least one instruction.

According to one characteristic, the instructions are broken down into a plurality of substeps.

According to one particularity, the substeps can consist of:
a step of acquiring the instruction,
a step of decoding the instruction,
a step of executing the instruction, and
a step of writing the result of the instruction.

According to one characteristic, the waiting time is introduced randomly between any two substeps of an instruction.

According to another characteristic, the instructions can be macro-instructions corresponding to complex logic modules such as sub-blocks of cryptographic algorithms.

According to another characteristic, the waiting time is introduced randomly several times during the execution of the sequence of instructions.

According to one characteristic, the waiting time is introduced following a software command preceding the sequence of instructions to be protected.

According to one characteristic, the method is implemented through a non-software implantation which is the direct responsibility of the instruction decoding electronics.

According to another characteristic, the introduction of the waiting time can be regulated statically or dynamically, by means of an electronic or software parameter, so as to adjust the variability of the execution of one and the same sequence of instructions.

According to one implementation of the invention, the method is implemented in an integrated circuit chip having a microcontroller with RISC architecture with pipeline.

The invention advantageously applies to any protected device of the chip card type.

The invention has the advantage of proposing a mechanism implemented directly at the level of the microcontroller, on the integrated circuit chip. The complexity of the software solutions is thus avoided.

In addition, the countermeasure method according to the invention guarantees the execution of any program, protected or not, on an electronic component equipped with such a countermeasure mechanism.

It is in fact the component itself, rather than the sequence of instructions of the program, which ensures the random execution and therefore the protection of the data being manipulated. This advantageously makes it possible to have programs decorrelated from the component, which can prove very useful in the context of certain applications. The same component can thus be used with different programs without losing its level of protection.

BRIEF DESCRIPTION OF THE DRAWINGS

Other advantages and particularities of the invention will emerge during the following description given by way of illustrative and non-limitative example with reference to the figures, in which:

FIG. 3 is a diagram illustrating the functioning of a conventional microcontroller with CISC architecture for a decoding of instructions, FIG. 4 is a diagram illustrating the functioning of a conventional microcontroller with RISC architecture for a decoding of instructions, FIG. 5 is a diagram illustrating the functioning of a microcontroller with RISC architecture according to the present invention, for a decoding of instructions.

DETAILED DESCRIPTION

Figure 1:
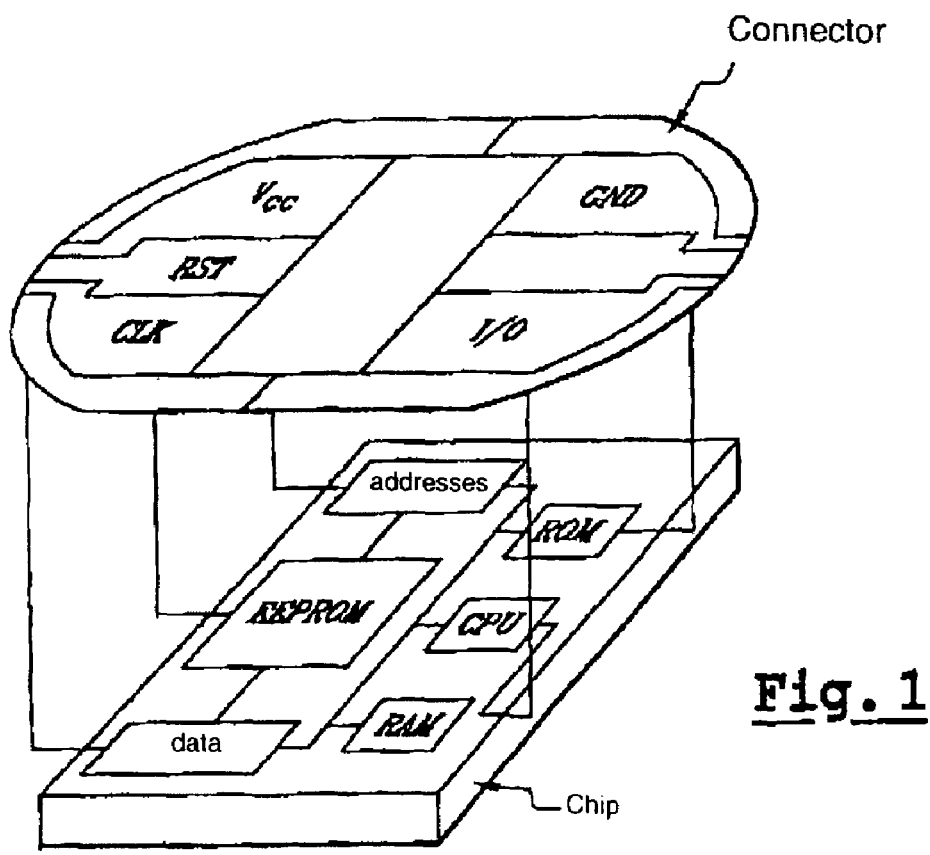
FIG. 1, already described, illustrates schematically an integrated circuit chip provided with a microcontroller, FIG. 2, already described, is a graph illustrating the method of power attack on a protected electronic component.
Figure 2:
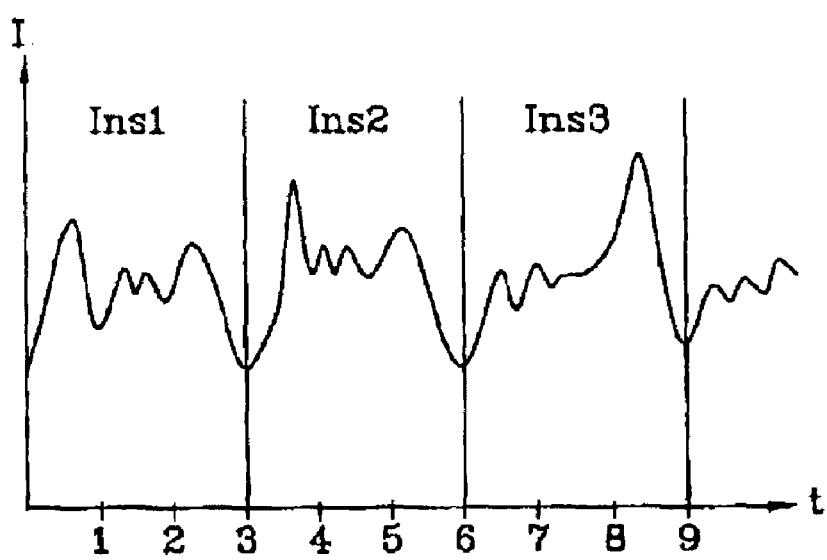

The countermeasure method according to the invention is based on the principle of the processing of instructions in pipeline generally used in a microcontroller with RISC architecture.

Several points distinguish RISC architecture from CISC architecture.

Firstly, to each instruction there corresponds a single logic block implemented in the form of a specific and unique electronic submodule, so that the decoding and execution of an instruction can take place in a single clock cycle, whilst CISC architecture uses a single electronic block sequentially processing all the instructions.

Secondly, the data bus is differentiated from the instruction bus to allow the decoding of an instruction at each clock cycle independently of the data stored in memory and used by the other instructions. This makes it possible to go and seek data in memory simultaneously with the decoding of the instructions which have to process them. In addition, all the instructions must have a size at least equal to that of the external data bus so that the decoding of the instructions is direct and entails no delay.

There are in general two models of microcontroller with RISC architecture,
the "Stanford" model, which uses chains of optimised instructions, more commonly known as the pipeline technique, making it possible to use a very powerful set of instructions;
the "Berkeley" model, which uses chains of instructions allowing rapid invocations of subroutines and particularly adapted to real-time applications.

The present invention applies more particularly to the pipeline technique proposed in the "Stanford" model. This is because the invention proposes a countermeasure method which relies on this pipeline architecture.

Pipelines make it possible to interleave the execution of several instructions by dividing each instruction into several substeps and executing these substeps in parallel. Thus a pipeline stage is defined as the set of substeps executed simultaneously. Thus the number of clock cycles per instruction will be divided proportionally to the number of pipeline stages.

It should be noted that, when a program, or more simply a series of instructions, is executed, the functioning of the pipeline may be broken when instructions arise such as branch, jump, interrupt and other exceptions to the linear execution of instructions.

FIGS. 3 and 4 illustrate respectively the conventional functioning of a microcontroller with CISC architecture and RISC architecture with pipeline.

The instructions INSn can be simple instructions or macro-instructions corresponding to complex logic modules, such as sub-blocks of cryptographic algorithms, such as for example permutation, compression or expansion constructions, non-basic mathematical functions, look-up tables, or others.

The instructions INSn are advantageously broken down into several substeps. An example of breaking down into four substeps is given by way of example and must not be considered to be restrictive.

The first step "F", from the English acronym "FETCH", makes it possible to seek in memory the instruction to be decoded. It places this instruction, which is next transmitted to the following stage, on the bus.

The second step "D", from the English acronym "DECODE", decodes the instruction, that is to say activates the submodule of the microcontroller which is able to process this instruction.

The third step "E", from the English acronym "EXECUTE", executes the instruction in the submodule of the microcontroller.

The last step "W", from the English acronym "WRITE", writes the result of the instruction executed by the submodule of the microcontroller on the bus. This result is then used in the remainder of the execution or returned to memory.

It can be seen, from FIG. 3, that only two instructions have been able to be completed in eight clock cycles by a microcontroller with CISC architecture.

Conversely, as illustrated in FIG. 4, for a pipeline with four substeps, six instructions have been able to be completed in only nine clock cycles. The total execution time is reduced because substeps of several instructions have been able to be executed simultaneously.

Such an architecture is however not immune from a power attack. This is because, if the same sequence of instructions is repeated several times, there will always be the same chaining of stages of the pipeline with the same current consumption.

In order to resolve the problem generated by power attacks and to prevent reproducibility of the current consumption for the same sequence of instructions executed several times, a waiting time, Break B, is introduced randomly into the processing of the instructions. This waiting time B can be introduced randomly at the start of an instruction and/or between any two substeps of one and the same instruction.

The random waiting time B can also be introduced several times if necessary during the execution of a sequence of instructions.

FIG. 5 illustrates the mechanism of the countermeasure method according to the invention.

The random waiting times B prevent any reproducibility of the current consumption by modifying, at each sequence of instructions, the pipeline stages without interfering with the execution of the instructions.

The method according to the invention is executed through a non-software implementation, directly executed by the electronic module (hardware) for decoding instructions of the microcontroller.

In its functioning, the method can be adjustable, statically or dynamically, by electronic or software means, in order to obtain more or less variability in the repeated execution of the same sequence of instructions.

According to one possibility of implementing the method according to the invention, the introduction of the waiting time B can be dependent on a start-up controlled in a software manner, for example just before the execution of the sequence of instructions which it is wished to protect. In this way the speed of execution of a sequence of instructions which does not require any particular protection is not compromised.

The method according to the invention thus ensures the random execution of a sequence of instructions, that is to say the non-reproducibility of this sequence from one execution to another, and this for the same functional result.

A compromise must simply be defined in order not to excessively extend the execution time for the sequence of instructions and thus lose the main advantage of the pipeline.

The invention claimed is:

1. A countermeasure method for a microcontroller that executes sequences of instructions according to a pipeline method, wherein an instruction comprises a plurality of substeps that are performed during respective clock cycles of said microcontroller, said method including the step of randomly introducing a wait time for a clock cycle between the clock cycles during which two successive substeps of an instruction are performed.

2. A countermeasure method according to claim 1, wherein the instructions are macro-instructions corresponding to complex logic modules.

3. A countermeasure method according to claim 2, wherein said complex logic modules comprise sub-blocks of cryptographic algorithms.

4. A countermeasure method according to claim 1, wherein a wait time is introduced randomly several times during the execution of the sequence of instructions.

5. A countermeasure method according to claim 4, wherein a wait time is introduced following a logic command preceding a sequence of instructions to be protected.

6. A countermeasure method according to claim 1, wherein the introduction of the wait time is effected through a non-software implementation executed by a module of the microcontroller that decodes the instructions.

7. A countermeasure method according to claim 1, wherein the introduction of the wait time is randomly determined by means of a parameter, so as to adjust the variability of the execution of one and the same sequence of instructions.

8. A method according to claim 1, wherein the introduction of the wait time is implemented in an integrated circuit chip having a microcontroller with RISC architecture with pipeline processing.

9. A protected device of the chip card type, including an electronic component that implements a countermeasure method by randomly introducing at least one wait time for a clock cycle between clock cycles during which successive substeps of an instruction are performed.

* * * * *